L. L. Jackson,
Ladies' Dress Guide.
Nº 90,363. Patented May 25, 1869.
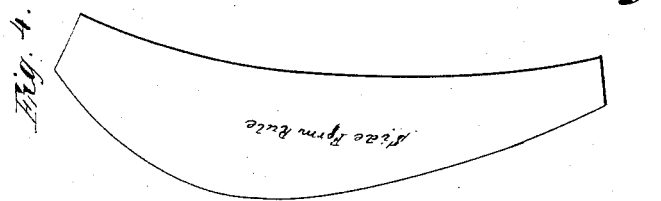
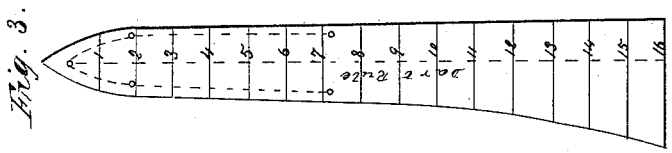
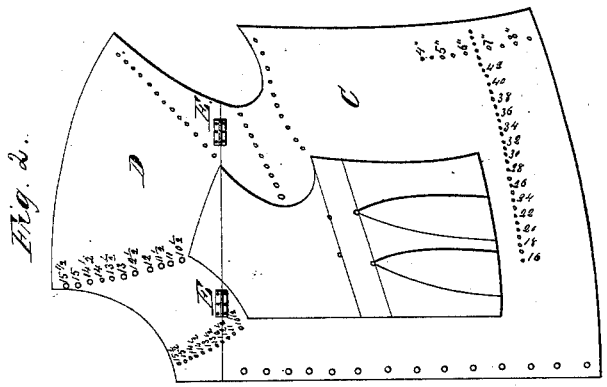
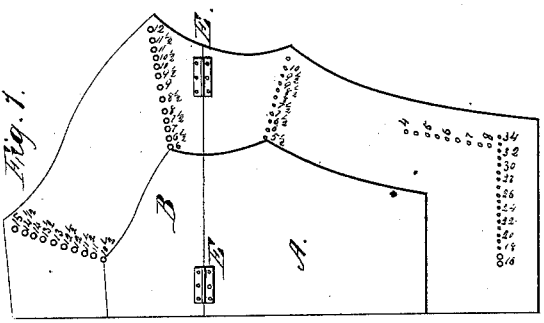
Witnesses:
Chas. F. Clausen
R. Mason
Inventor:
Levi L. Jackson
by D. F. Holloway & Co.
his attys.

LOUISA L. JACKSON, OF RICHMOND, INDIANA.

Letters Patent No. 90,363, dated May 25, 1869.

---

IMPROVEMENT IN GUIDES FOR MEASURING THE PERSON AND CUTTING OUT LADIES' DRESSES.

---

The Schedule referred to in these Letters Patent and making part of the same.

---

*To all whom it may concern:*

Be it known that I, LOUISA L. JACKSON, of Richmond, in the county of Wayne, and State of Indiana, have invented a new and useful Improvement in Guides for Cutting Ladies' Dresses; and I do hereby declare that the following is a full, clear, and exact description of the same, reference being had to the annexed drawings, making part of this specification, in which—

Figure 1 is the back rule;
Figure 2 is the front rule;
Figure 3 is the dart rule; and
Figure 4 is the side-form rule.

These several rules are respectively formed and marked with dots, lines and figures, as represented in the drawings.

The back and front rules are respectively formed from either one or two pieces of sheet-metal or cardboard. In the latter case, they would be hinged together, so that they could be folded, for convenience in transportation.

The rows of dots on the drawing represent corresponding rows of holes through the rules, and the figures indicate distances, to be determined in practice by six actual measurements of the person to be fitted, indicated in inches and fractions of inches.

Thus, take a large sheet of blank paper, and, having taken the neck-measurement, mark the measurement in both rows for that measurement through the perforations; second, then for the measurement from the neck to the shoulder; third, for the measurement from arm to arm, across the breast, marking opposite the figure indicating one-half the breast-measure, also marking the same in the row underneath, forming the curve of the arm-size; fourth, measure from under the arm downward for the length of waist, and mark the corresponding number; fifth, measure across the back from arm to arm; and sixth, the distance around the waist; then dot for the hooks and eyes, and then for the darts; then draw lines from dot to dot, following the external configuration of the plates, to give the shape.

What I claim as my invention, and desire to secure by Letters Patent, is—

1. The several guides, shown in figs. 1, 2, 3, and 4, when constructed with the configuration, and perforated and marked with figures, as set forth, said parts being intended for use in combination with one another, in forming dress-patterns from six measurements of the person, substantially as described.

2. The back rule, shown in fig. 1, having a row of perforations, to determine the proper position of the hooks and eyes on each side, substantially as described.

In testimony whereof, I have signed my name to this specification, in the presence of two subscribing witnesses.

LOU. L. JACKSON.

Witnesses:
   Mrs. MYRA JOHNSON,
   Mrs. REBECCA J. CLARK.